United States Patent
Kohashi et al.

(10) Patent No.: US 6,852,411 B2
(45) Date of Patent: Feb. 8, 2005

(54) POLYESTER FIBERS FOR RUBBER REINFORCEMENT AND DIPPED CORDS USING SAME

(75) Inventors: Masanao Kohashi, Tsuruga (JP); Katsutoshi Imaoka, Tsuruga (JP); Mitsuhiro Sakuda, Tsuruga (JP)

(73) Assignee: Toyo Boseki Kabushiki Kaisha, Osaka (JP)

( * ) Notice: Subject to any disclaimer, the term of this patent is extended or adjusted under 35 U.S.C. 154(b) by 0 days.

(21) Appl. No.: 09/912,442

(22) Filed: Jul. 26, 2001

(65) Prior Publication Data

US 2002/0045044 A1 Apr. 18, 2002

(30) Foreign Application Priority Data

Jul. 28, 2000 (JP) ......................................... 2000-228891
Mar. 30, 2001 (JP) ......................................... 2001-101023

(51) Int. Cl.[7] ........................... D02G 3/00; D02G 15/00; D01D 5/12; B29C 49/08
(52) U.S. Cl. ........................ 428/375; 428/359; 428/364; 428/373; 428/395; 264/210.3; 264/210.7; 264/210.8
(58) Field of Search ................................. 428/364, 375, 428/376, 373, 395; 264/210.3, 210.7, 210.8

(56) References Cited

U.S. PATENT DOCUMENTS

| | | | |
|---|---|---|---|
| 4,414,169 A | * 11/1983 | McClary | 264/210.7 |
| 4,491,657 A | * 1/1985 | Saito et al. | 528/308.1 |
| 5,049,447 A | 9/1991 | Shindo et al. | 428/373 |
| 5,472,781 A | * 12/1995 | Kim et al. | 428/364 |
| 5,891,567 A | * 4/1999 | Kim et al. | 428/364 |
| 6,329,053 B2 | * 12/2001 | Kim et al. | 428/364 |

FOREIGN PATENT DOCUMENTS

| | | |
|---|---|---|
| EP | 0 162 313 | 11/1985 |
| EP | 0 450 607 | 10/1991 |
| EP | 0 546 859 | 6/1993 |
| JP | 2569720 | 10/1996 |
| JP | 2775923 | 5/1998 |
| WO | 97/24478 | 7/1997 |

* cited by examiner

Primary Examiner—Rena Dye
Assistant Examiner—Camie S Thompson
(74) Attorney, Agent, or Firm—Foley & Lardner LLP

(57) ABSTRACT

A polyester fiber containing polyethylene terephthalate at 90 mol % or higher of a whole repeating unit in a molecular chain thereof, the fiber having an intrinsic viscosity (IV) of 0.85 dl/g or higher and simultaneously meeting the following characteristics: (a) strength≧6.0 cN/dtex; (b) strength× (breaking elongation)$^{0.5}$≦26.0 cN/dtex. %$^{0.5}$; (c) monofilament linear density≦5.0 dtex; and (d) main dispersion peak temperature of loss tangent (tan δ) in the measurement of dynamic viscoelasticity at 110 Hz≦147.0° C., and a polyester dipped cord, which is obtainable by twisting one or more than one base yarn together into a pretwisted yarn, where the base yarn is made of a polyester fiber twisting two or more pretwisted yarns together into a greige cord; and subjecting the greige cord to dip treatment to give a dipped cord simultaneously meeting the following characteristics: (a) tenacity conversion efficiency in the dip treatment (dipped cord tenacity/greige cord tenacity)≧96%; and (b) elongation at a specific load+dry heat shrinkage≦7.5%.

6 Claims, No Drawings

POLYESTER FIBERS FOR RUBBER REINFORCEMENT AND DIPPED CORDS USING SAME

FILED OF INVENTION

The present invention relates to polyester fibers applied to industrial materials such as tire cords, V-belts, conveyor belts and hoses, particularly to polyester fibers used for rubber reinforcement, and dipped cords using the same, where dipped cords have high modulus and low shrinkage and exhibit excellent tenacity conversion efficiency in the dip treatment.

BACKGROUND OF THE INVENTION

Polyester fibers are excellent in mechanical properties, dimensional stability and endurance, and therefore, they have been widely used not only for clothing applications but also for industrial applications, particularly for rubber reinforcement of industrial materials such as tire cords, V-belts, conveyor belts and hoses. For tire cord applications, the use of radial tires for automobiles has been advanced, so that there have been requested comfortable able feeling and excellent driving stability in the high-speed running as well as lightweightness for the reduction of fuel consumption. Therefore, fibers having high modulus and low shrinkage and further having high strength have been strongly requested as dipped cords for carcass plies.

For the preparation of polyethylene terephthalate fibers having these excellent characteristics, there has been known a process comprising melt spinning polyethylene terephthalate, followed by taking up at a relatively high spinning speed of 1000 to 3000 m/min to give a high oriented undrawn yarn having a birefringence of 0.02 to 0.07, what is called POY, and then heat drawing the POY at a low ratio of 1.5 to 3.5 (hereinafter referred to as the POY method). The polyester fibers prepared by such a process are very excellent as a technique of attaining high modulus and low shrinkage, in comparison with high strength fibers prepared by a process comprising melt spinning, followed by taking up at a low spinning speed of 1000 m/min or lower to give a low oriented undrawn yarn having a birefringence of 0.01 or lower, and then heat drawing the undrawn yarn at a high ratio of 4 to 7 (hereinafter referred to as the UDY method).

However, the polyester fibers obtained by the POY method, although they have excellent characteristics as described above, have apparently lower strength and breaking elongation than the polyester fibers obtained by the UDY method, and when the fibers have low breaking elongation in such a manner, a decrease of tenacity becomes great in the twisting and in the dip treatment, so that the resulting cords have low tenacity which is insufficient as dipped cords.

To comply with such a request, for example, in the Japanese Patent No. 2,569,720, high strength dipped cords exhibiting excellent tenacity conversion efficiency in the dip treatment are obtained by the use of a base yarn meeting the conditions that breaking elongation$\geq$11% and toughness is 30 to 36 g/d. $\%^{0.5}$ (26.5 to 31.8 cN/dtex. $\%^{0.5}$). For dimensional stability, however, these dipped cords cannot meet the level further requested in recent years for high modulus and low shrinkage, by which substitution for rayon may be taken into account.

In the Japanese Patent No. 2,775,923, high strength dipped cords are obtained by the use of a base yarn meeting the condition that toughness$\geq$elongation at a specific load+dry heat shrinkage+22.0. However, the dimensional stability of dipped cords is not expressly described in this patent publication, the level of which is therefore unknown.

SUMMARY OF THE INVENTION

Under these circumstances, the present invention has been made to provide polyester fibers for rubber reinforcement and dipped cords using the same, by which substitution for rayon may be taken into account, where the dipped cords have high modulus and low shrinkage and exhibit excellent tenacity conversion efficiency in the dip treatment.

Thus the present invention provides a polyester fiber comprising polyethylene terephthalate at 90 mol % or higher of a whole repeating unit in a molecular chain thereof, the fiber having an intrinsic viscosity [IV] of 0.85 dl/g or higher and simultaneously meeting the following characteristics:
(a) strength$\geq$6.0 cN/dtex;
(b) strength×(breaking elongation)$^{0.5}\leq$26.0 cN/dtex. $\%^{0.5}$;
(c) monofilament linear density$\leq$5.0 dtex; and
(d) main dispersion peak temperature of loss tangent (tan δ) in the measurement of dynamic viscoelasticity at 110 Hz$\leq$147.0° C.

The present invention further provides a polyester dipped cord, which is obtainable by twisting one or more than one base yarn together into a pretwisted yarn, where the base yarn is made of a polyester fiber according to any one of claims 1 to 4; twisting two or more pretwisted yarns together into a greige cord; and subjecting the greige cord to dip treatment to give a dipped cord simultaneously meeting the following characteristics:
(a) tenacity conversion efficiency in the dip treatment (dipped cord tenacity/greige cord tenacity)$\geq$96%; and
(b) elongation at a specific load+dry heat shrinkage$\leq$7.5%.

DETAILED DESCRIPTION OF THE INVENTION

The polyester fiber used in the present invention should be made of polyethylene terephthalate at 90 mol % or higher of a whole repeating unit in a molecular chain thereof and should have an intrinsic viscosity [IV] of 0.85 dl/g or higher. The polyester fiber having an intrinsic viscosity [IV] of lower than 0.85 cannot meet basic characteristics as a rubber reinforcing material, including high strength and high endurance. From the viewpoint of workability such as properties in the yarn making, the polyester fiber may preferably have an intrinsic viscosity [IV] of 1.10 or lower, more preferably 1.00 or lower.

The toughness as used herein is a measure corresponding to the toughness of polyester fibers (i.e., work load necessary for fiber breaking) and defined as strength×(breaking elongation)$^{0.5}$. In the prior art, high strength dip-treated cords are prepared, for example, by the use of a base yarn having a breaking elongation of 11% or higher and a toughness of 30 to 35 g/d. $\%^{0.5}$ (26.5 to 31.8 cN/dtex. $\%^{0.5}$) in the Japanese Patent No. 2,569,720 and by the use of a base yarn meeting the condition that toughness$\geq$(elongation at a specific load+dry heat shrinkage)+22.0 in the Japanese Patent No. 2,775,923. In these two publications, both patents are characterized in that a decrease of tenacity is reduced both in the twisting and in the dip treatment by making large the toughness of a base yarn to attain excellent tenacity of dipped cords.

In contrast, the present inventors have extensively studied and as a result they have found a surprising fact that tenacity conversion efficiency in the dip treatment can be maintained on a very high level by the use of a polyester fiber having strength and elongation meeting the conditions that strength≧6.0 cN/dtex and strength×(breaking elongation)$^{0.5}$≦26.0 cN/dtex. %$^{0.5}$, preferably strength×(breaking elongation)$^{0.5}$≦25.0 cN/dtex. %$^{0.5}$, more preferably strength×(breaking elongation)$^{0.5}$≦24.0 cN/dtex. %$^{0.5}$, and particularly strength×(breaking elongation)$^{0.5}$≦23.0 cN/dtex. %$^{0.5}$, and although the fiber has a very small toughness as compared with the prior art, the fiber simultaneously meeting the claimed characteristics (c) and (d), i e., monofilament linear density≦5.0 dtex; and main dispersion peak temperature of loss tangent (tan δ) in the measurement of dynamic viscoelasticity at 110 Hz≦147.0° C.

Thus the polyester fibers of the present invention exhibit very high tenacity conversion efficiency in the dip treatment and are therefore characterized in that even when a base yarn having decreased strength are used from the viewpoint of working stability, it is not necessary to abandon the tenacity of dipped cords finally required.

Further, Examples in the Japanese Patent No. 2,569,720 involve the use of resin chips having an intrinsic viscosity [IV] of 1.3 to 1.8 to give a fiber having an intrinsic viscosity [IV] of 1.05 to 1.15 for the purpose of attaining the large toughness. In contrast, the present invention dissolves the problems by the use of resin chips having an intrinsic viscosity [IV] of 0.95 to give a fiber having an intrinsic viscosity [IV] of 0.89 to 0.90. The present invention is characterized in that viscosity is very low and a decrease of intrinsic viscosity is low at the spinning step as compared with the Japanese Patent No. 2,569,720. This makes it possible to provide an advantage of resin chips from the viewpoint of cost and to attain good workability because of difficulty in forming thermally deteriorated products in the melt extrusion for spinning The monofilament linear density should be 5 dtex or lower for the purpose of meeting further high modulus and low shrinkage. When the monofilament linear density is higher than 5 dtex, high modulus and low shrinkage cannot be attained and tenacity conversion efficiency in the dip treatment cannot be maintained on a very high level.

It is not clear why monofilament linear density makes a contribution to tenacity conversion efficiency in the dip treatment. This seems because a difference of stress distribution in the monofilaments becomes small in the cooling and solidification at the spinning step to improve the uniformity of the core and skin layers of monofilaments.

This action makes it possible to attain further excellent synergistic effect by setting the temperature of a cooling air in the spinning step at 50° C. for higher, preferably 60° C. or higher.

The main dispersion peak temperature of loss tangent (tan δ) (hereinafter referred to as Tα) in the measurement of dynamic viscoelasticity at 110 Hz is a measure showing the degree of restriction in the amorphous chain, and lower Tα means weak restriction of the amorphous chain.

For the purpose of attaining high modulus and low shrinkage, by which substitution for rayon may be taken into account, it should be met that Tα≦147.0° C. When Tα>147.0° C., a base yarn has insufficient potential to meet low shrinkage. Further, Tα shows good correspondence to the birefringence and specific gravity of an undrawn yarn, i.e., the degree of orientation and crystallization at the spinning step. Tα≦147° C., which is one of the claimed conditions, corresponds to the birefringence of an undrawn yarn≧0.075 and the specific gravity of an undrawn yarn≧1.355 under the conditions of spinning, as shown in Examples, and means a region in which orientation and crystallization have highly progressed.

The greige cord is prepared by twisting one or more than one base yarn together into a pretwisted yarn, where the base yarn is made of polyester fibers of the present invention, and twisting two or more pretwisted yarns together. The number of twists is not particularly limited, and the number of pretwists may be equal to or different from the number of final twists.

The conditions of dip treatment in the present invention are also not particularly limited. As a preferred example thereof, it is desirable that multistep heat treatment is carried out in one bath or in two or more baths containing a treatment liquid composed mainly of resorcin-formalin-latex according to the ordinary method and further containing a chlorophenol-type carrier and an adhesive aid such as an epoxy or an isocyanate. Further, it is desirable that the temperature of heat treatment in the heat-set step and in the normalizing step is 210° C. to 250° C.

To maintain high dipped cord tenacity, tenacity conversion efficiency in the dip treatment should meet the condition that tenacity conversion efficiency in the dip treatment≧96%. Preferably, tenacity conversion efficiency in the dip treatment≧98%, more preferably≧100%. When tenacity conversion efficiency in the dip treatment is lower than 96%, the strength of base yarns should be increased to maintain high tenacity of dipped cords, which may cause a problem of decreased workability in the yarn making. Alternatively, when insufficiency of the tenacity of dipped cords is compensated by a technique such as increasing the cord pick density of a tire fabric or using a base yarn having higher linear density, this results in a disadvantage to light-weighting or cost reduction.

Examples in the Japanese Patent No. 2,569,720 show the toughness of a base yarn ranging from 30 to 36 g/d. %$^{0.5}$ (26.5 to 31.8 cN/dtex. %$^{0.5}$), which is much higher than the toughness of a base yarn≦26.0 cN/dtex. %$^{0.5}$ in the present invention; however, in Examples of the Japanese Patent, tenacity conversion efficiency in the dip treatment is no more than about 95% to 96%, from which it is clear how far tenacity conversion efficiency in the present invention is excellent.

The elongation at a specific load+dry heat shrinkage is a measure showing the dimensional stability of a cord. The elongation at a specific load is a measure corresponding to the modulus of a cord. Lower elongation at a specific load means higher modulus. In other words, a smaller sum of elongation at a specific load and dry heat shrinkage means that a cord has both high modulus and low shrinkage. A division between elongation at a specific load and shrinkage is not particularly limited, but there is a proper balance depending upon the conditions of vulcanization and the applications. From such a viewpoint, a dipped cord, by which substitution for rayon may be taken into account, should meet the condition that elongation at a specific load+dry heat shrinkage≦7.5%. In the present invention, dimensional stability is remarkably improved as compared with Examples in the Japanese Patent No. 2,569,720 showing the elongation at a specific load+dry heat shrinkage of about 8.0%.

EXAMPLES

The present invention will hereinafter be further illustrated by some examples; however, the present invention is not limited to these examples. The values for various physical properties were determined by the following methods.

Intrinsic Viscosity

A polymer was dissolved in a mixed solvent of para-chlorophenol and tetrachloroethane at a ratio of 3:1 to have a concentration of 0.4 g/dl, and the solution was measured for intrinsic viscosity at 30° C.

Linear Density

According to the definition of JIS-L1017, a sample was left in a room with a temperature-humidity control at 20° C. under 65% RH for 24 hours, and then measured for linear density.

Tenacity and Elongation

According to the definition of JIS-L1017, a sample was left in a room with a temperature-humidity control at 20° C. under 65% RH for 24 hours, and then measured for tenacity, breaking elongation, and elongation at a specific load. The load for elongation at a specific load of a base yarn is defined by 4.0 cN×the standard linear density of a sample, and the load for elongation at a specific load of a greige cord and a dip-treated cord is defined by 2.0 cN×the standard linear density of a sample. The standard linear density of a cord is 2880 dtex, for example, in the case of 1440 dtex/2.

Dynamic Viscoelasticity

A sample paralleled to correspond to 500 dtex in an initial test length of 4.0 cm was measured at a frequency of 110 Hz under an initial load of 0.009 cN/dtex at a temperature increasing speed of 1° C./min from room temperature to determine the main dispersion peak temperature of loss tangent (tan δ).

Shrinkage

According to the definition of JIS-L1017, a sample was left in a room with a temperature-humidity control at 20° C. under 65% RH for 24 hours, followed by heat treatment under no load in a drying machine at 150° C. for 30 minutes, and shrinkage was determined from a difference in test length before and after the heat treatment.

Dimensional Stability

The sum of elongation at a specific load and shrinkage as described above was taken as a measure of dimensional stability.

Example 1

A base yarn was prepared by spinning chips of polyethylene terephthalate having an intrinsic viscosity [IV] of 0.95 into filaments at a spinning temperature of 310° C. from a spinneret with 336 holes at a controlled through-put so that the filaments came to have a linear density of 1440 tex, and the filaments were allowed to cool and solidify with a 1.0-m/sec cooling air at 70° C. in a spinning cylinder and taken up at a spinning speed of 3400 m/min (the undrawn yarn had a birefringence of 0.089 and a specific gravity of 1.368), and subsequently, drawing and heat treatment under relaxation were carried out for the same undrawn yarn so that the base yarn came to have a strength of 6.9 cN/dtex and an elongation at a specific load of about 5.5%.

A greige cord was prepared by twisting two base yarns to have a linear density of 1440 dtex/2 and a twist number of 43×43 (t/10 cm).

A dipped cord was prepared by dipping the greige cord into the first treatment liquid composed of a mixture of resorcin-formalin-latex (hereinafter referred to as RFL) and "Vulcabond E" available form Vulnacs Corporation, followed by drying in an oven at 120° C. for 56 seconds and then heat treatment under tension to give an elongation rate of 4.0% in an oven at 240° C. for 45 seconds, and subsequently dipping the cord into the second treatment liquid composed of RFL, followed by drying in an oven at 120° C. for 56 seconds and then heat treatment under relaxation to give a relaxation rate of 2.0% in an oven at 235° C. for 45 seconds. This is an example where the dimensional stability of the dipped cord was remarkably improved. Since tenacity conversion efficiency in the dip treatment was excellent, although the tenacity of the base yarn was lower, the tenacity of the dipped cord was higher than those of Comparative Examples 1 and 3.

Example 2

A dipped cord was prepared by the same production process as described in Example 1, except that drawing and heat treatment under relaxation were carried out for the same undrawn yarn so that the base yarn came to have a strength of 6.4 cN/dtex and an elongation at a specific load of about 5.5%. The constitution of the greige cord and the conditions of dip treatment were the same as described in Example 1. This is an example where the final tenacity of the dipped cord was adjusted similarly to those of Comparative Examples 1 and 3. Since tenacity conversion efficiency in the dip treatment was very excellent, the tenacity of the base yarn can be set very lower, and as a result, it becomes possible to make an improvement both in dimensional stability and in workability.

Example 3

A dipped cord was prepared by the same production process as described in Example 1, except that the filaments were allowed to cool and solidify with a 0.8-m/sec cooling air at 70° C. and taken up at a spinning speed of 3200 m/min (the undrawn yarn had a birefringence of 0.078 and a specific gravity of 1.356), and subsequently, drawing and heat treatment under relaxation were carried out for the same undrawn yarn so that the base yarn came to have a strength of 7.1 cN/dtex and an elongation at a specific load of about 5.5%. The constitution of the greige cord and the conditions of dip treatment were the same as described in Example 1. This is an example where the spinning speed used in Example 1 was slightly decreased and an improvement of the tenacity of the dipped cord was regarded as most important.

Example 4

A dipped cord was prepared by the same production process as described in Example 1, except that the spinneret was replaced by another one having 380 holes, the filaments were allowed to cool and solidify with a 1.0-m/sec cooling air at 70° C. and taken up at a spinning speed of 3200 m/min (the undrawn yarn had a birefringence of 0.080 and a specific gravity of 1.360), and subsequently, drawing and heat treatment under relaxation were carried out for the same undrawn yarn so that the base yarn came to have a strength of 7.1 cN/dtex and an elongation at a specific load of about 5.5%. The constitution of the greige cord and the conditions of dip treatment were the same as described in Example 1. This is an example where monofilament linear density was most decreased in Examples, and from a comparison with Example 3, it can be found that a decrease of monofilament linear density improves both the dimensional stability and tenacity conversion efficiency of the dipped cord. In Examples 1 to 4, it can also be found that smaller toughness or smaller Tα makes an improvement of tenacity conversion efficiency in the dip treatment.

Comparative Example 1

A dipped cord was prepared by the same production process as described in Example 1, except that the filaments were allowed to cool and solidify with a 0.8-m/sec cooling air at 70° C. and taken up at a spinning speed of 3000 m/min (the undrawn yarn had a birefringence of 0.072 and a specific gravity of 1.347), and subsequently, drawing and heat treatment under relaxation were carried out for the same undrawn yarn so that the base yarn came to have a strength of 7.1 cN/dtex and an elongation at a specific load of about 5.5%. The constitution of the greige cord and the conditions of dip treatment were the same as described in Example 1. Tα was out of the claimed range, and as a result, both the dimensional stability and tenacity conversion efficiency of the dipped cord became insufficient.

Comparative Example 2

A dipped cord was prepared by the same production process as described in Example 1, except that the spinneret was replaced by another one having 250 holes, the filaments were allowed to cool and solidify with a 0.8-m/sec cooling air at 70° C. and taken up at a spinning speed of 3500 m/min (the undrawn yarn had a birefringence of 0.085 and a specific gravity of 1.363), and subsequently, drawing and heat treatment under relaxation were carried out for the same undrawn yarn so that the base yarn came to have a strength of 6.9 cN/dtex and an elongation at a specific load of about 5.5%. The constitution of the greige cord and the conditions of dip treatment were the same as described in Example 1. The monofilament linear density was out of the claimed range, and as a result, the tenacity conversion efficiency of the dipped cord became insufficient.

Comparative Example 3

A dipped cord was prepared by the same production process as described in Example 1, except that the spinneret was replaced by another one having 250 holes, the filaments were allowed to cool and solidify with a 0.8-m/sec cooling air at 70° C. and taken up at a spinning speed of 3200 m/min (the undrawn yarn had a birefringence of 0.075 and a specific gravity of 1.345), and subsequently, drawing and heat treatment under relaxation were carried out for the same undrawn yarn so that the base yarn came to have a strength of 7.1 cN/dtex and an elongation at a specific load of about 5.5%. The constitution of the greige cord and the conditions of dip treatment were the same as described in Example 1. The monofilament linear density and Tα mwere out of the claimed ranges, and as a result, both the dimensional stability and tenacity conversion efficiency of the dipped cord became insufficient.

Comparative Example 4

A dipped cord was prepared by the same production process as described in Example 1, except that a high-viscosity resin having an intrinsic viscosity [IV] of 1.10 was used, the spinneret was replaced by another one having 250 holes, the filaments were allowed to cool and solidify with a 0.8-m/sec cooling air at 70° C. and taken up at a spinning speed of 3200 m/min (the undrawn yarn had a birefringence of 0.071 and a specific gravity of 1.350), and subsequently, drawing and heat treatment under relaxation were carried out for the same undrawn yarn so that the base yarn came to have a strength of 7.4 cN/dtex and an elongation at a specific load of about 5.5%. The constitution of the greige cord and the conditions of dip treatment were the same as described in Example 1. The toughness, monofilament linear density, and Tα were all out of the claimed ranges, and as a result, although the strength of the base yarn was high, tenacity conversion efficiency was low, so that the strength of the dipped cord remained on the same level with that of Example 3. In addition, dimensional stability was insufficient.

The preparation conditions and physical properties of base yarns in Examples 1–4 and Comparative Examples 1–4 are shown in Table 1, and the physical properties of greige cords are shown in Table 2, and the physical properties of dipped cords are shown in Table 3.

TABLE 1

Preparation conditions and physical properties of base yarns

| | | Example 1 | Example 2 | Example 3 | Example 4 | Comp. Ex. 1 | Comp. Ex. 2 | Comp. Ex. 3 | Comp. Ex. 4 |
|---|---|---|---|---|---|---|---|---|---|
| Preparation conditions | | | | | | | | | |
| Intrinsic viscosity (resin) | dl/g | 0.95 | 0.95 | 0.95 | 0.95 | 0.95 | 0.95 | 0.95 | 1.10 |
| Spinning speed | m/min | 3400 | 3400 | 3200 | 3200 | 3000 | 3500 | 3200 | 3000 |
| Number of filaments | — | 336 | 336 | 336 | 380 | 336 | 250 | 250 | 250 |
| Monofilament linear density | dtex/fil | 4.3 | 4.3 | 4.3 | 3.8 | 4.3 | 5.8 | 5.8 | 5.8 |
| Physical properties | | | | | | | | | |
| Birefringence of undrawn yarn × $10^3$ | — | 89 | 89 | 78 | 80 | 72 | 85 | 75 | 71 |
| Specific gravity of undrawn yarn | — | 1.368 | 1.368 | 1.356 | 1.360 | 1.347 | 1.363 | 1.345 | 1.350 |
| Intrinsic viscosity (base yarn) | dl/g | 0.895 | 0.896 | 0.890 | 0.897 | 0.891 | 0.894 | 0.891 | 0.955 |
| Linear density | dtex | 1440 | 1442 | 1441 | 1440 | 1444 | 1438 | 1440 | 1443 |
| Tenacity | N | 99 | 93 | 103 | 103 | 103 | 99 | 103 | 107 |

TABLE 1-continued

Preparation conditions and physical properties of base yarns

|  |  | Example 1 | Example 2 | Example 3 | Example 4 | Comp. Ex. 1 | Comp. Ex. 2 | Comp. Ex. 3 | Comp. Ex. 4 |
|---|---|---|---|---|---|---|---|---|---|
| Strength | cN/dtex | 6.9 | 6.4 | 7.1 | 7.1 | 7.1 | 6.9 | 7.1 | 7.4 |
| Elongation at a specific load | % | 5.4 | 5.6 | 5.5 | 5.6 | 5.6 | 5.6 | 5.5 | 5.5 |
| Breaking elongation | % | 10.4 | 11.6 | 12.5 | 12.0 | 12.6 | 12.5 | 12.3 | 12.6 |
| Strength × (breaking elongation)$^{0.5}$ | cN/dtex. %$^{0.5}$ | 22.3 | 21.8 | 25.1 | 24.6 | 25.2 | 24.4 | 24.9 | 26.3 |
| Main dispersion peak temperature of loss tangent | °C. | 144.5 | 144.5 | 146.5 | 146.0 | 147.2 | 145.6 | 147.5 | 147.3 |

TABLE 2

Physical properties of greige cords

|  |  | Example 1 | Example 2 | Example 3 | Example 4 | Comp. Ex. 1 | Comp. Ex. 2 | Comp. Ex. 3 | Comp. Ex. 4 |
|---|---|---|---|---|---|---|---|---|---|
| Tenacity | N | 175 | 168 | 184 | 183 | 184 | 178 | 184 | 191 |
| Elongation at a specific load | % | 6.5 | 6.6 | 6.5 | 6.5 | 6.4 | 6.5 | 6.5 | 6.3 |
| Breaking elongation | % | 17.3 | 18.5 | 17.5 | 17.8 | 17.1 | 17.5 | 18.0 | 18.6 |
| Tenacity conversion efficiency (greige cord/base yarn) | % | 88.4 | 90.3 | 89.3 | 88.8 | 89.3 | 89.9 | 89.3 | 89.3 |

TABLE 3

Physical properties of dipped cords

|  |  | Example 1 | Example 2 | Example 3 | Example 4 | Comp. Ex. 1 | Comp. Ex. 2 | Comp. Ex. 3 | Comp. Ex. 4 |
|---|---|---|---|---|---|---|---|---|---|
| Tenacity | N | 180 | 174 | 182 | 183 | 175 | 170 | 174 | 182 |
| Elongation at a specific load | % | 4.1 | 4.2 | 4.2 | 4.2 | 4.1 | 4.1 | 4.3 | 4.1 |
| Breaking elongation | % | 15.0 | 15.5 | 15.6 | 15.9 | 14.8 | 14.8 | 13.5 | 15.6 |
| Shrinkage | % | 2.5 | 2.3 | 3.0 | 2.8 | 3.5 | 3.1 | 3.5 | 3.6 |
| Elongation at a specific load + shrinkage | % | 6.6 | 6.5 | 7.2 | 7.0 | 7.6 | 7.2 | 7.8 | 7.7 |
| Tenacity conversion efficiency (dipped cord/greige cord) | % | 102.9 | 103.6 | 98.9 | 100.0 | 95.1 | 95.5 | 94.6 | 95.3 |
| Tenacity conversion efficiency (dipped cord/base yarn) | % | 90.9 | 93.5 | 88.3 | 88.8 | 85.0 | 85.9 | 84.5 | 85.0 |

According to the present invention, there can be provided polyester fibers for rubber reinforcement and dipped cords having a combination of high modulus and low shrinkage, which have not been attained in the past, and high strength, wherein a decrease of dipped cord strength having been abandoned in the past to attain high modulus and low shrinkage is prevented by a remarkable improvement of tenacity conversion efficiency in the dip treatment.

What is claimed is:

1. A polyester fiber comprising polyethylene terephthalate at 90 mol % or higher of a whole repeating unit in a molecular chain thereof, the fiber having an intrinsic viscosity (IV) of 0.85 dl/g or higher and simultaneously meeting the following characteristics:

(a) strength 6.0 cN/dtex;
   (b) strength×(breaking elongation)$^{0.5}$24.0 cN/dtex. %$^{0.5}$;
   (c) monofilament linear density≦5.0 dtex;
   (d) main dispersion peak temperature of loss tangent (tan δ) in the measurement of dynamic viscoelasticity at 110 Hz≦147.0° C. and
   (e) a birefringence of an undrawn yarn>0.08.

2. The polyester fiber according to claim 1, wherein the strength×(breaking elongation)$^{0.5}$ is 23.0 cN/dtex. %$^{0.5}$ or lower.

3. A polyester dipped cord, which is obtainable by twisting one or more than one base yarn together into a pretwisted yarn, where the base yarn is made of a polyester fiber according to claim 1; twisting two or more pretwisted yarns together into a greige cord; and subjecting the greige cord to dip treatment to give a dipped cord simultaneously meeting the following characteristics:

(a) tenacity conversion efficiency in the dip treatment (dipped cord tenacity/greige cord tenacity)≧96%; and
   (b) elongation at a specific load+dry heat shrinkage≦7.5%.

4. The polyester dipped cord according to claim 3, wherein the tenacity conversion efficiency in the dip treatment (dipped cord tenacity/greige cord tenacity) is 98% or higher.

5. A method of making a polyester dipped cord, comprising:

twisting one or more than one base yarn together into a pretwisted yarn, wherein the base yarn is made of a polyester fiber comprising polyethylene terephthalate at 90 mol % or higher of a whole repeating unit in a molecular chain thereof, the fiber having an intrinsic viscosity (IV) of 0.85 dl/g or higher and simultaneously having:

(a) strength$\geq$6.0 cN/dtex, (b) strength$\times$(breaking elongation)$^{0.5}$$\leq$24.0 cN/dtex.%$^{0.5}$, (c) monofilament linear density$\leq$5.0 dtex, (d) main dispersion peak temperature of loss tangent (tan δ) in the measurement of dynamic viscoelasticity at 110 Hz$\leq$147.0° C.; and (e) a birefringence of an undrawn yarn>0.08: twisting two or more pretwisted yarns together into a greige cord; and subjecting the greige cord to dip treatment to obtain a dipped cord having:

(f) tenacity conversion efficiency in the dip treatment (dipped cord tenacity/greige cord tenacity)$\geq$96%, and (g) elongation at a specific load+dry heat shrinkage$\leq$7.5%.

6. The method of claim 5 wherein the tenacity conversion efficiency obtained in the dip treatment (dipped cord tenacity/greige cord tenacity) is 98% or higher.

* * * * *